(No Model.)
A. L. COLBURN.
DEVICE FOR TRANSMITTING POWER.
No. 315,735. Patented Apr. 14, 1885.
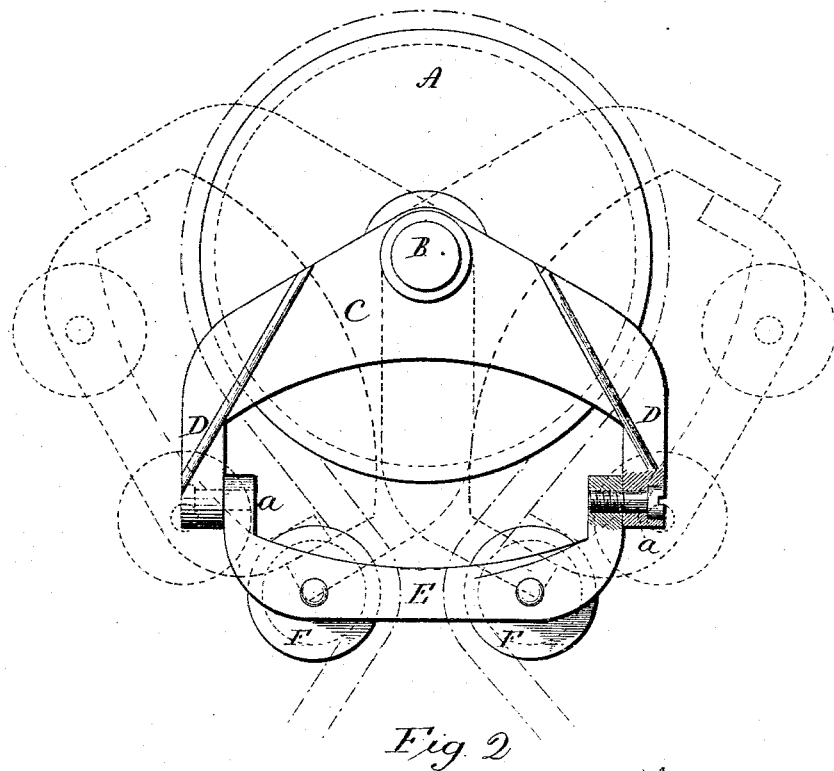
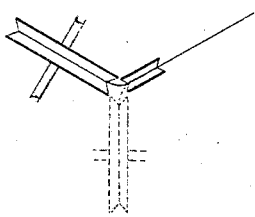
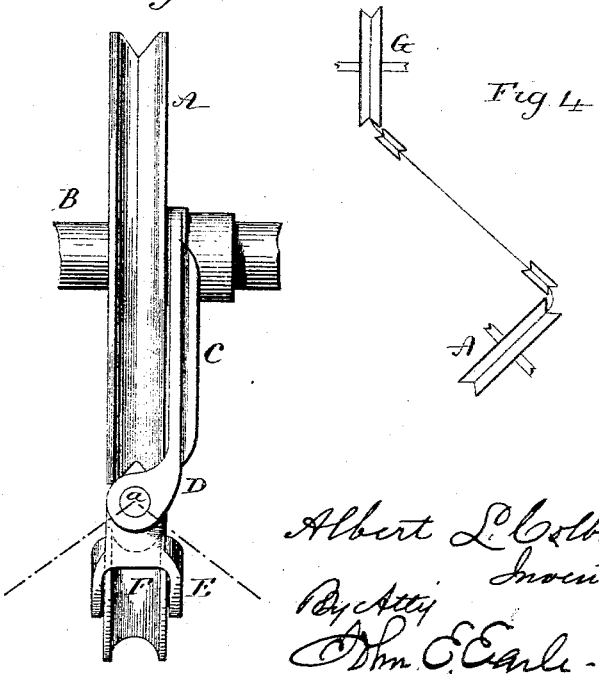
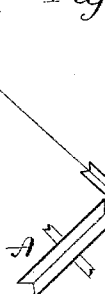

UNITED STATES PATENT OFFICE.

ALBERT L. COLBURN, OF DERBY, CONNECTICUT.

DEVICE FOR TRANSMITTING POWER.

SPECIFICATION forming part of Letters Patent No. 315,735, dated April 14, 1885.

Application filed February 24, 1885. (No model.)

*To all whom it may concern:*

Be it known that I, ALBERT L. COLBURN, of Derby, in the county of New Haven and State of Connecticut, have invented a new Improvement in Devices for Transmitting Power; and I do hereby declare the following, when taken in connection with accompanying drawings and the letters of reference marked thereon, to be a full, clear, and exact description of the same, and which said drawings constitute part of this specification, and represent, in—

Figure 1, a side view of the device complete; Fig. 2, an edge view of the same; Figs. 3 and 4, illustrations to show the working of the device.

This invention relates to a device for transmitting power, having for its object the application of power where the construction requires frequent change; and the invention consists in a grooved principal pulley adapted to receive a corresponding band, combined with a yoke carrying guide-pulleys, the said guide-pulleys through said yoke universally adjustable to different angles with relation to the said principal pulley, as more fully hereinafter described.

A represents the principal pulley, through which the power is to be communicated. As here represented, this may be to a shaft, B, upon which the pulley is fixed.

Hung upon the same shaft, or concentric with the pulley A, is a yoke, C, adapted to swing in a plane parallel with the main pulley, with the center of the main pulley as its center of movement. The arms D D of the yoke C extend outside the face of the pulley, and into the arms D D of the yoke a saddle, E, is hung upon pivots a, the axis of the pivots being at right angles to the axis of the pulley A, the line of the axis upon which the saddle is hung being substantially in the central plane of the principal pulley A.

In the saddle E two guide-pulleys, F F, are hung, and so that they may stand in the same plane with the pulley A. The pulleys F F are grooved upon their periphery to correspond to the groove in the pulley A, and so that the band coming from the pulley from which the power is derived will pass between the pulleys F F and around the pulley A, as indicated in broken lines, Fig. 1, the pulleys F F serving as guide-pulleys to hold the band in contact with a considerable portion of the principal pulley. The line of the pivots $a$ is between the pulleys F and the pulley A, as shown, and so that while the pulleys F may be turned out of their parallelism with the main pulley, as indicated in broken lines, Fig. 2, they will still guide the band and hold it in its proper relation to the principal pulley A, and so that, no matter to what extent the angle of the shaft or axis of the pulley A may be turned, the pulleys F will, through the pivots $a$, still retain the same relation to the direction of the band, and serve to guide the band onto the pulley, as indicated in Fig. 3, different angles being shown in broken lines.

Supposing, for illustration, the principal pulley to be applied to a hand-drill, and the power coming through the band from a fixed pulley at a distance to the band runs around the self-adjusting pulleys F F, and thence around the principal pulley A, and because of the self-adjustment of the pulleys F to the pulley A, they will always guide the band on the pulley A and prevent its possible escape therefrom. It will be understood that in the employment of this device a round belt is preferable. Because of the yoke C being hung concentric with the principal pulley, it may be turned to different positions, taking with it the guide-pulleys F F, as indicated in broken lines, Fig. 1. Such turning, being in a plane parallel with the main pulley, retains the guide-pulleys always in the same relation to the principal pulley, thus giving to the guide-pulleys a universal adjustment with relation to the principal pulley, so that no matter what the construction of the principal pulley may be, or the pulley from which the power is derived, the band will be so properly directed onto the principal pulley A as to readily impart rotation thereto.

This device is applicable to any point in the transmission of power where a variation of the angle of a shaft or a change of direction of the band is desired. Where a change of direction from the main or driving pulley is desired, it will be understood that this same self-adjusting saddle with pulleys is to be employed, and whereby, in a change in the plane of the path of the band from the plane of either the driving or driven pulleys, the band upon the driving or driven pulleys will always maintain the same relation to those pulleys, respectively, and as seen in Fig. 4, in which A represents the driven pulley, and G the driving-pulley.

While I prefer to employ the yoke C, hung so as to swing concentric with the main pulley, as a support for the saddle and its pulleys, the saddle and its pulleys may be hung upon fixed bearings—that is to say, without the movement of the yoke. In that case their adjustment will be only in relation to the plane of the pulley, and not to its radius. Such an adjustment would generally be sufficient at the driving-pulley; and as an illustration of this modification the yoke C may be supposed to be rigidly fixed upon the bearing which supports the pulley A, and in no way adjustable with relation to the pulley A.

I claim—

1. The combination of the principal grooved pulley A, the saddle E, hung to swing upon an axis at right angles to the axis of the pulley A, and guide-pulleys F F, hung in said saddle, their axes parallel with the axis of the principal pulley, substantially as described, and so that the plane of said guide-pulleys may be universally adjustable with relation to the plane of the principal pulley, substantially as described.

2. The combination of the principal grooved pulley A, the yoke C, hung concentric with the axis of said pulley, and so as to swing in a plane parallel therewith, the saddle E, hung in said yoke, the axis of said saddle being at right angles to the axis of the said pulley, and guide-pulleys F F, hung in said saddle, substantially as described.

ALBERT L. COLBURN.

Witnesses:
JOHN C. SHELLEY,
EDWIN B. GAGER.